United States Patent
Enoch et al.

(10) Patent No.: US 8,249,460 B2
(45) Date of Patent: Aug. 21, 2012

(54) APPARATUS AND METHOD FOR GENERATING AN RF SIGNAL

(75) Inventors: Michael Enoch, Placitas, NM (US); Parmijit Samra, Fremont, CA (US); Anthony C. Kowalczyk, San Carlos, CA (US)

(73) Assignee: Lockheed Martin Corporation, Bethesda, MD (US)

(*) Notice: Subject to any disclaimer, the term of this patent is extended or adjusted under 35 U.S.C. 154(b) by 966 days.

(21) Appl. No.: 12/143,686

(22) Filed: Jun. 20, 2008

(65) Prior Publication Data
US 2008/0316588 A1 Dec. 25, 2008

Related U.S. Application Data

(60) Provisional application No. 60/929,341, filed on Jun. 22, 2007.

(51) Int. Cl.
H04B 10/00 (2006.01)

(52) U.S. Cl. ........ 398/115; 398/186; 398/189; 398/140; 398/202

(58) Field of Classification Search ................. 398/115, 398/187–191, 186, 140, 202
See application file for complete search history.

(56) References Cited

U.S. PATENT DOCUMENTS

| 5,060,306 | A | * | 10/1991 | Nakamura et al. | 398/183 |
| 5,408,351 | A | * | 4/1995 | Huang | 398/191 |
| 5,822,103 | A | * | 10/1998 | Boroson | 398/189 |
| 6,211,996 | B1 | * | 4/2001 | Fuse | 359/278 |
| 6,567,217 | B1 | * | 5/2003 | Kowarz et al. | 359/618 |
| 6,865,348 | B2 | * | 3/2005 | Miyamoto et al. | 398/183 |
| 7,024,120 | B2 | | 4/2006 | Reynolds et al. | |
| 7,079,780 | B1 | * | 7/2006 | Rollins | 398/198 |
| 7,342,651 | B1 | * | 3/2008 | Woolfson | 356/28 |
| 7,769,303 | B2 | * | 8/2010 | Myong et al. | 398/192 |
| 7,853,152 | B2 | * | 12/2010 | Nishihara et al. | 398/175 |
| 8,103,168 | B1 | * | 1/2012 | Enoch et al. | 398/140 |
| 2004/0120642 | A1 | * | 6/2004 | Hayes | 385/32 |
| 2004/0179842 | A1 | * | 9/2004 | Futami et al. | 398/75 |
| 2004/0190907 | A1 | | 9/2004 | Litvin | |
| 2005/0129350 | A1 | | 6/2005 | Welch et al. | |
| 2005/0201759 | A1 | * | 9/2005 | Wang et al. | 398/183 |
| 2006/0002719 | A1 | * | 1/2006 | Fuse | 398/189 |
| 2006/0067709 | A1 | | 3/2006 | Newberg et al. | |
| 2010/0022102 | A1 | * | 1/2010 | Kawakami et al. | 438/795 |
| 2010/0040095 | A1 | * | 2/2010 | Mielke et al. | 372/25 |
| 2011/0076019 | A1 | * | 3/2011 | Rahn et al. | 398/65 |

* cited by examiner

Primary Examiner — Kenneth N Vanderpuye
Assistant Examiner — Hibret Woldekidan
(74) Attorney, Agent, or Firm — McDermott Will & Emery LLP

(57) ABSTRACT

An apparatus for generating an RF signal is provided includes a driver configured to generate a timing control for two optical signals. The apparatus further includes at least one optical pulse source configured to generate the two optical signals based on the timing control. In addition, the apparatus includes a photodetector configured to receive the two optical signals as input and further configured to generate an RF signal based on the two optical signals. A method for generating an RF signal is also provided.

15 Claims, 12 Drawing Sheets

APPARATUS AND METHOD FOR GENERATING AN RF SIGNAL

CLAIM OF PRIORITY UNDER 35 U.S.C. §119

This application claims the benefit of priority under 35 U.S.C. §119 from U.S. Provisional Application Ser. No. 60/929,341, entitled "DISCRETE TIME OPTICAL SIGNAL WIDEBAND ARBITRARY SIGNAL SYNTHESIZER (DTOS-WASS)," filed Jun. 22, 2007, which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

FIELD

The subject technology relates generally to generation of RF signals, and more specifically to an apparatus and method for generating an RF signal.

BACKGROUND

For RF signal generators and synthesis techniques, a digital-to-analog converter (DAC) device may be used as a waveform generator, up to the bandwidth limitation of a device (e.g., ½ the sample rate). If additional frequency coverage is needed, then a 2-stage architecture is typically used, where a baseband signal is typically generated and then mixed or modulated up to the desired carrier frequency.

However, conventional RF signal generators are not without problems. For example, it may be desired to have more extended operating frequency ranges, both in terms of carrier frequency and bandwidth of resulting synthesized signals. Greater ability to generate arbitrary chirp characteristics may also be desired. In addition, it may be desired to reduce the need for high performance RF oscillators and RF tuning elements.

SUMMARY

In accordance with the disclosure, the generation of an RF signal includes generating a timing control for two optical signals, and generating the two optical signals based on the timing control. An RF signal is generated based on the two optical signals.

In one aspect of the disclosure, an apparatus for generating an RF signal is provided. The apparatus includes a driver configured to generate a timing control for two optical signals, and at least one optical pulse source configured to generate the two optical signals based on the timing control. In addition, the apparatus includes a photodetector configured to receive the two optical signals as input and further configured to generate an RF signal based on the two optical signals.

In a further aspect of the disclosure, a method for generating an RF signal is provided. The method includes generating a timing control for two optical signals, and generating the two optical signals based on the timing control. In addition, the method includes generating an RF signal based on the two optical signals.

In yet a further aspect of the disclosure, a machine-readable medium encoded with instructions for generating an RF signal is provided. The instructions include code for generating a timing control for two optical signals, and generating the two optical signals based on the timing control. In addition, the instructions include code for generating an RF signal based on the two optical signals.

DETAILED DESCRIPTION

Figure 1:
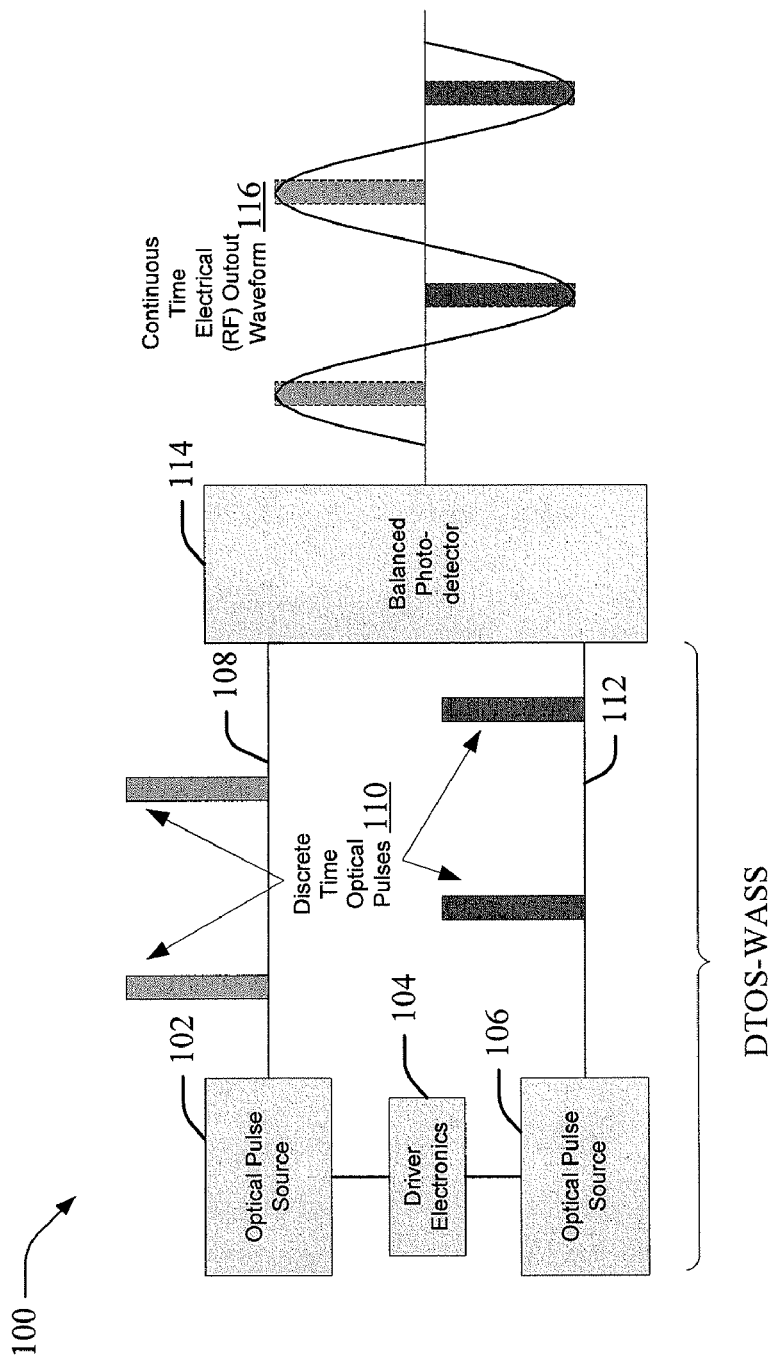
FIG. 1 is a block diagram illustrating an example of a device for generating an RF signal.

FIG. 1 is a block diagram illustrating an example of a device for generating an RF signal. In this regard, it should be noted that reference to an RF signal within this disclosure can also refer to a microwave signal. In FIG. 1, two sets of optical pulses 110 may be input into two input ports of a balanced photodetector 114, to generate a desired RF output signal 116.

Optical pulses 110 may be used create the equivalent of a time sampled version of the desired output signal. Balanced photodetector 114 may be used to perform the optical to electrical conversions of the signal back to the electric (RF) domain. In addition, balanced photodetector 114 may act as a reconstruction filter to provide a continuous time (RF) output signal.

As can be seen in FIG. 1, optical pulses 110 may be provided to balanced photodector 114, on an upper arm 108 and a lower arm 112. The use of lower arm 112 may allow for the generation of negative values with an optical signal, since the amplitude of an optical pulse is typically a positive value. Furthermore, no significant DC component is seen to be generated.

A driver electronics block 104 may be used to generate the timing control for the optical pulse generation, controlling the synchronization between two optical pulse sources 102 and 106. Driver electronics block 104 may be a high stability clock that is used to trigger the optical pulse generation in each of the optical pulse sources 102 and 106 at the correct relative timing between the upper and lower arms 108 and 112.

Driver electronics block 104, optical pulse sources 102 and 106, and upper and lower arms 108 and 112 may be seen to correspond with the generation of discrete time optical signals (DTOS) as a wideband arbitrary signal synthesizer (WASS). In this regard, as illustrated in FIG. 1, these components may be grouped together as DTOS-WASS. However, it should be noted that these components should not be limited to DTOS-WASS. In addition, certain components may be added or omitted and still correspond with DTOS-WASS.

Optical pulses 110 should typically be generated at a rate that satisfies the Nyquist criteria for the desired output signal. For example, if the desired output signal is a CW tone at 10 GHz, the composite frequency rate for the optical pulse used to generate the signal should typically be 20 GHz. However, the implementation may be simplified, since signals on each input port of balanced photodetector 114 would be at 10 GHz, which is typically considered to be an acceptable value for optical technologies.

Balanced photodetector 114 may be in a direct detection mode of operation. As such, there may be no constraints on the specific wavelength used for the optical pulse generation. This may allow multiple laser sources to be used in combination to generate optical pulse trains 108, allowing lower speed and lower cost optical devices. For example, lasers may be used in parallel to generate much higher composite pulse trains, as illustrated in FIG. 2.

Figure 2:
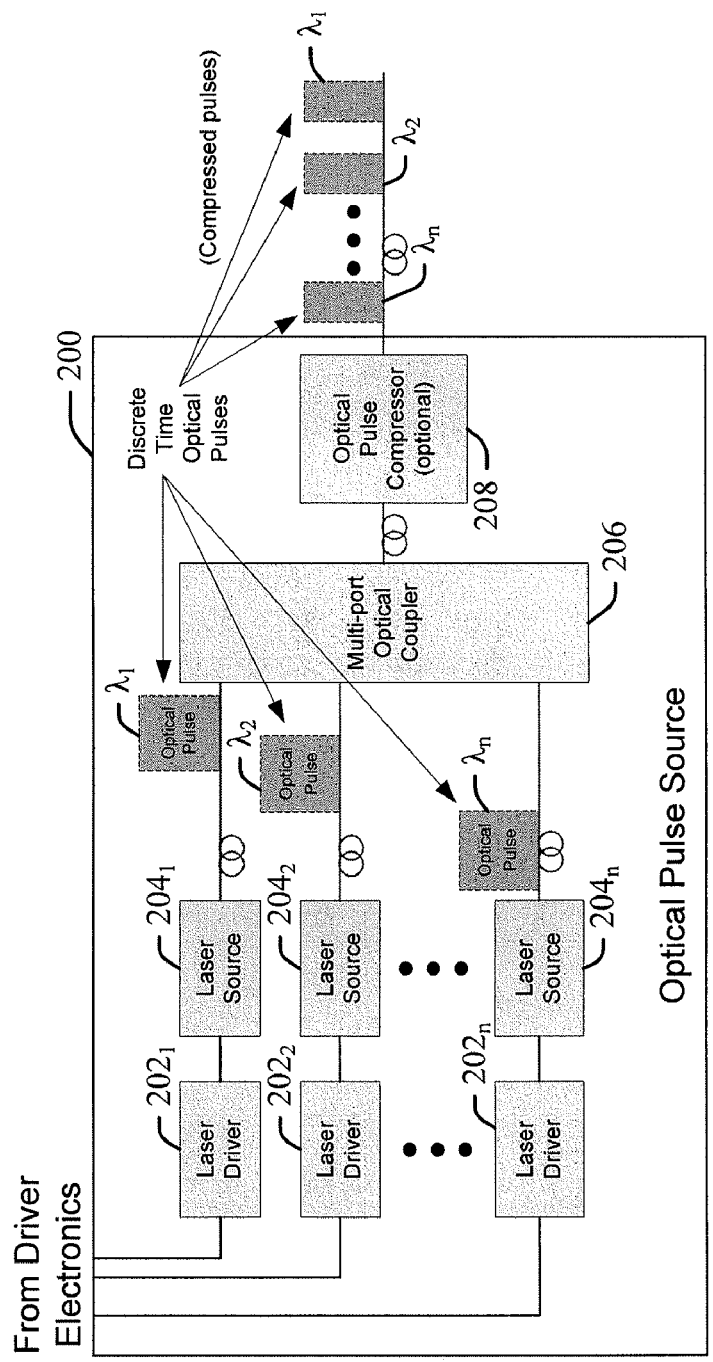
FIG. 2 is a block diagram illustrating an example of the optical pulse source illustrated in FIG. 1.

FIG. 2 is a block diagram illustrating an example of the optical pulse source illustrated in FIG. 1. FIG. 2 illustrates one example of implementing optical pulse source 200 using multiple lasers. The configuration illustrated in FIG. 2 may allow for lower performance and cost lasers to be used to enable the DTOS-WASS of FIG. 1 to generate signals in excess of the bandwidth capabilities of the individual lasers.

Driver electronics 104 may generate the trigger for each laser driver $202_1$ to $202_n$ in optical pulse source 200 at the appropriate timing offset. Each laser source $204_1$ to $204_n$ may generate an optical pulse $\lambda_1$ to $\lambda_n$ when its respective laser driver $202_1$ to $202_n$ is triggered. Optical pulses $\lambda_1$ to $\lambda_n$ may be combined into a single pulse stream using a multi-port optical coupler 206. Multi-port optical coupler 206 may be a passive coupler, such as a fiber optic star coupler. The combined single pulse stream may be further processed by an optical pulse compressor 208, which is optional. Optical pulse compressor 208 may be implemented as a passive dispersive delay line device, such as a length of non-linear optical fiber. If used, optical pulse compressor 208 may output compressed pulses $\lambda_1$ to $\lambda_n$.

As can be seen in FIG. 1, each of upper arm 108 and lower arm 112 of the DTOS-WASS may be associated with a separate optical pulse source 102 and 106, respectively. However, it should be noted that one optical pulse source may be used to generate the optical pulses 110 for both upper and lower arms 108 and 112 in a single arrangement. For example, this may be done by placing a 2-port wavelength selective device at the output of optical pulse source 200 to separate out the pulse streams for each arm by appropriate triggering of laser sources $204_1$ to $204_n$. However, this may require that an approximately equal number of laser sources fall within each out pass-band of the 2-port device.

Various examples of generating different types of waveforms using the device of FIG. 1 (and FIGS. 8 to 10, described later) will now be described, with particular references to FIGS. 3 to 7. For example, simple modifications of the optical pulse train may allow for direct modulation or synthesis of a number of different signal types, such as frequency modulation, chirp and phase modulation (PM).

Figure 3:
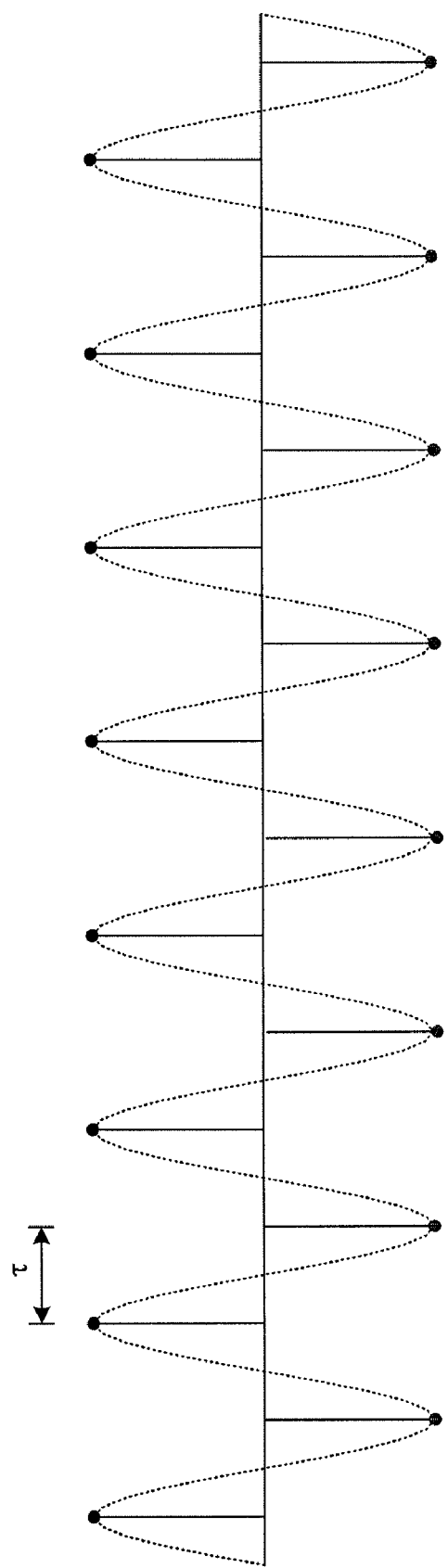
FIG. 3 is a diagram illustrating an example of generating a continuous waveform (CW).
Figure 4:
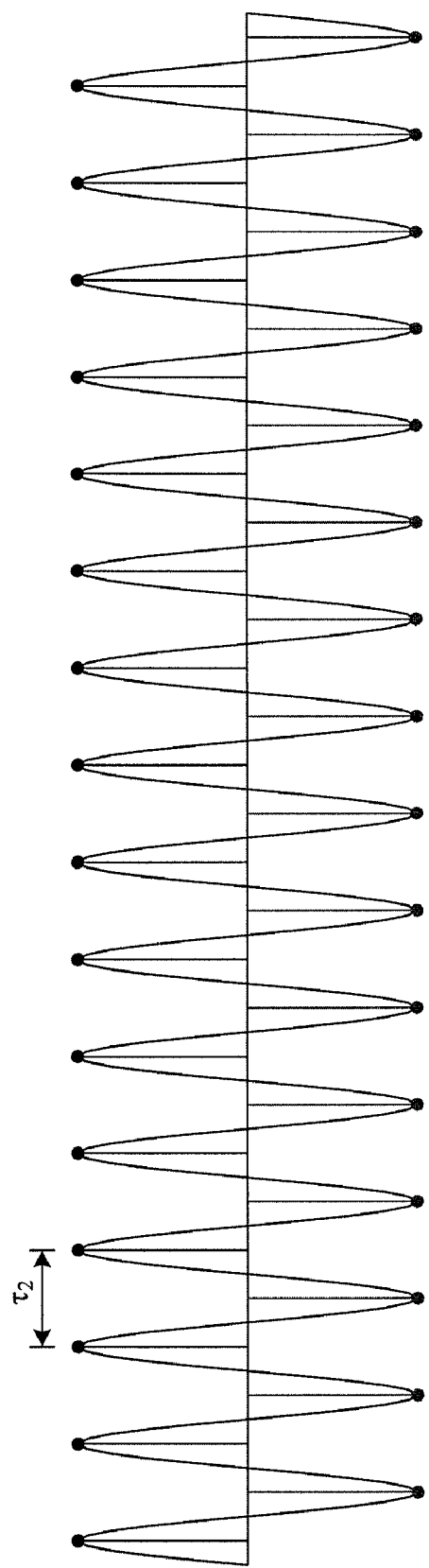
FIG. 4 is a diagram illustrating a further example of generating a continuous waveform (CW).

FIGS. 3 and 4 are diagrams illustrating different examples of generating a continuous waveform (CW). FIG. 3 shows a CW signal at frequency f, determined by the sample rate $\tau$. FIG. 4 shows another CW signal, at frequency $f_2$, determined by the sample rate $\tau_2$. By varying the sample rate, the output signal frequency may be tuned to any desired value (subject to the Nyquist constraint). The effective tuning speed may only then be limited by the actual sample rate, allowing near instantaneous tuning without necessarily having to evaluate the intermediary frequencies. In addition, the need for a settling time allowance typically required in tunable RF oscillators may be reduced or eliminated.

Figure 5:
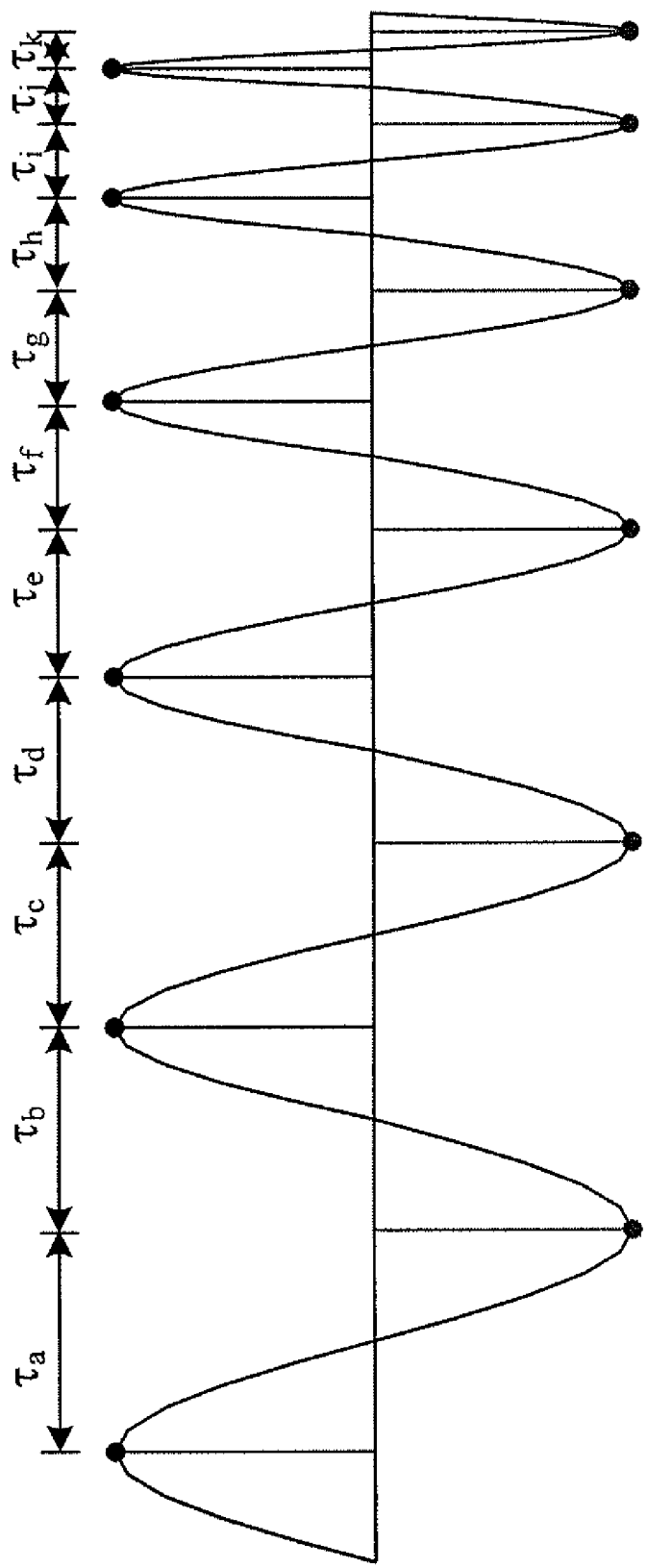
FIG. 5 is a diagram illustrating an example of generating a linear frequency chirp waveform.

FIG. 5 is a diagram illustrating an example of generating a linear frequency chirp waveform. In the case of a chirped signal, the equivalent of a frequency sweep may be accomplished by varying the effective sample period between optical sampling pulses. Reducing the time interval between pulses may result in a chirp with increasing frequency, and increasing the time interval between pulses may result in a chirp decreasing frequency. By varying the length and direction of the frequency sweeps, frequency modulated signals may be generated. Also, by alternating between two fixed sample periods, a binary frequency shift keyed (FSK) signal may be generated. In addition, by varying the sample periods in a more complicated sequence, a frequency hopping spread spectrum signal may be generated. Further, by modifying the sequence of optical pulses, phase modulation may be accomplished.

Figure 6:
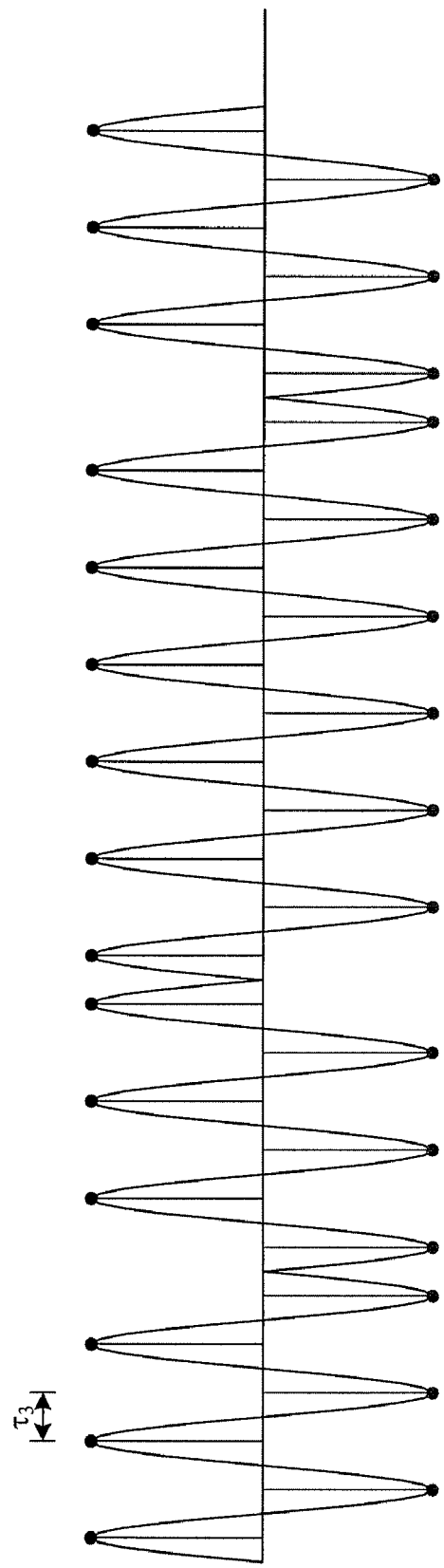
FIG. 6 is a diagram illustrating an example of generating a binary phase shift keyed (BPSK) modulated signal.

FIG. 6 is a diagram illustrating an example of generating a binary phase shift keyed (BPSK) modulated signal. More particularly, FIG. 6 illustrates a case of transposing the optical pulse sequences to obtain a BPSK modulated signal centered about the carrier frequency $f_3$. Though it may be relatively more complex, linear and non-linear phase modulation may be accomplished by varying the timing offset of the pulse train between upper and lower arms 108 and 122 for balanced photodetector 114 of FIG. 1, while maintaining the fixed equivalent sample rate or period for consecutive pulses on each arm.

Figure 7:
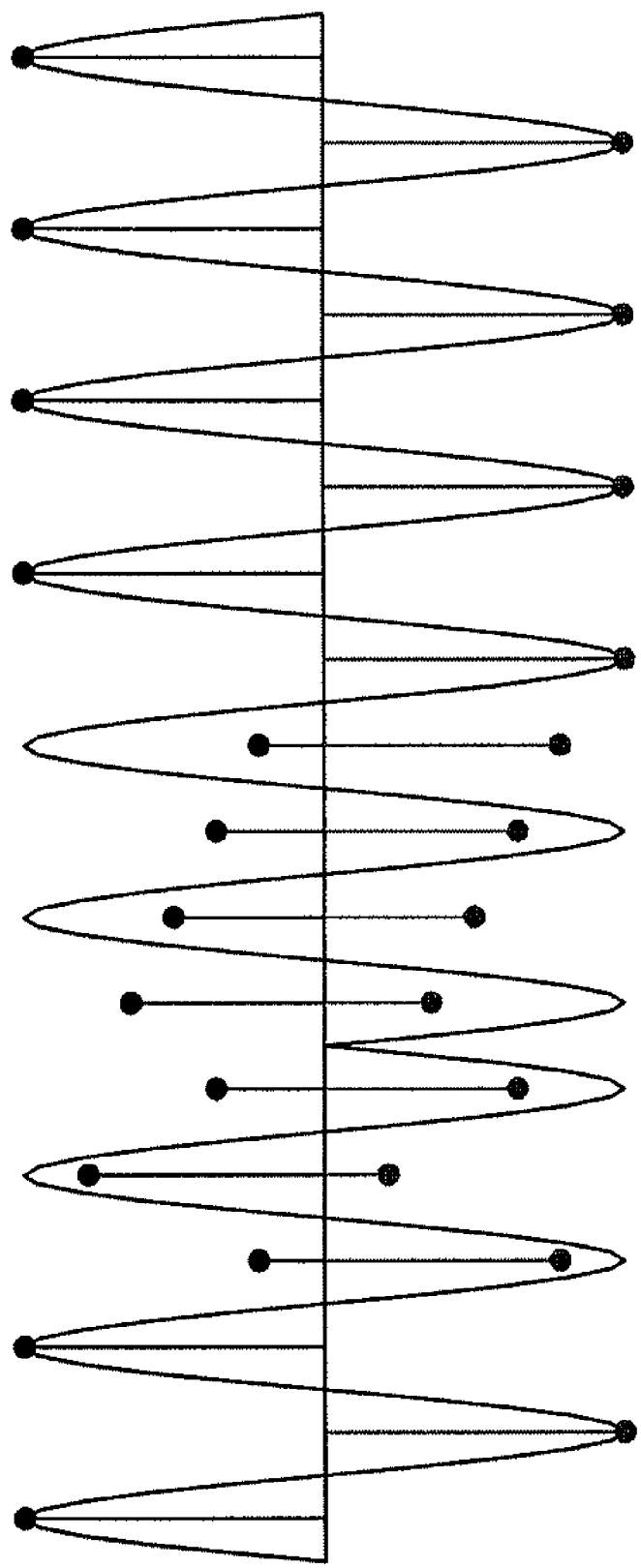
FIG. 7 is a diagram illustrating an example of generating a linear phase modulated waveform.

FIG. 7 is a diagram illustrating an example of generating a linear phase modulated waveform. More particularly, FIG. 7 illustrates an approach to phase modulation, which may be accomplished by an amplitude transition between upper and lower arms 108 and 112 of balanced photodetector 114. In addition, phase modulation may be accomplished by sliding the alternate phases of the signal with respect to each other, while maintaining a fixed average frequency of the signals.

Figure 8:
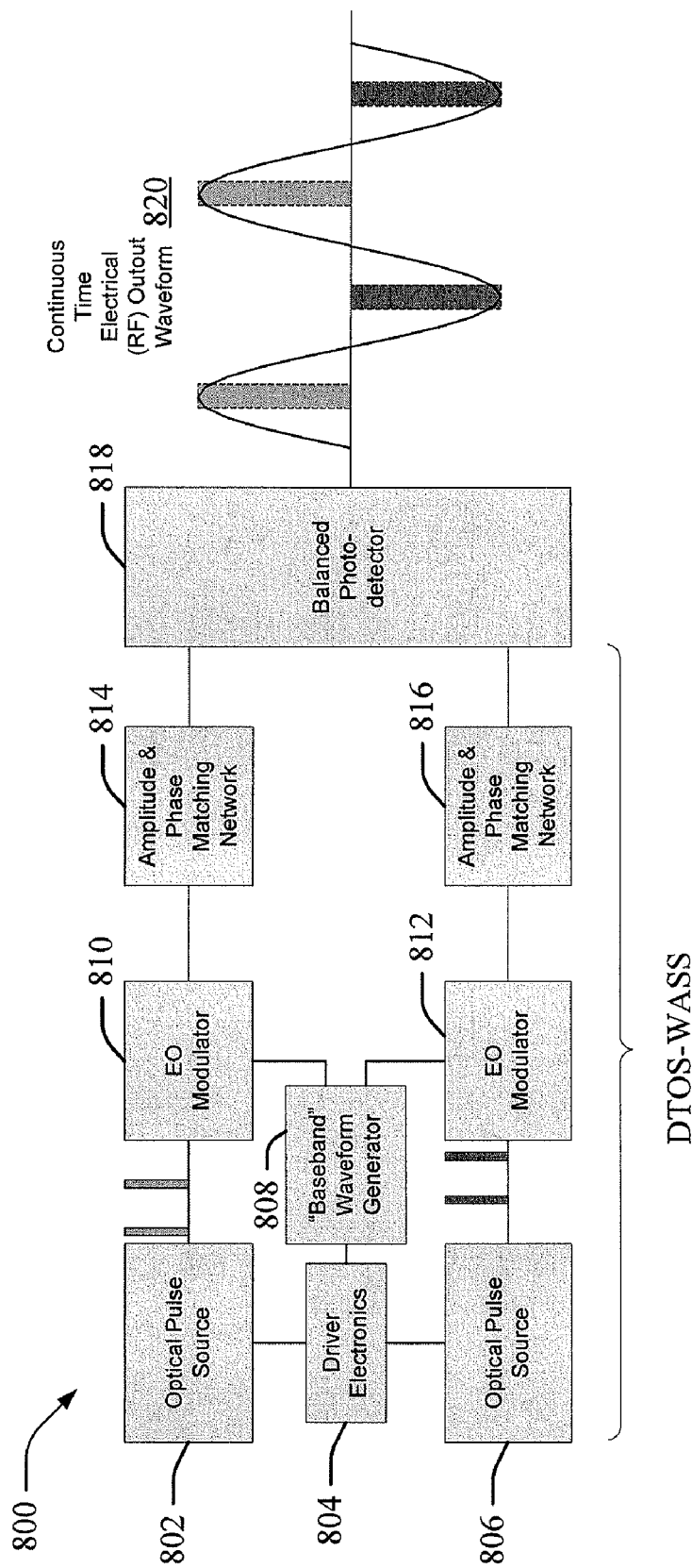
FIG. 8 is a block diagram illustrating a further example of a device for generating an RF signal.

FIG. 8 is a block diagram illustrating a further example of a device for generating an RF signal. As noted above, reference to an RF signal within this disclosure can also refer to a microwave signal. In addition to direct manipulation or modulation of the equivalent carrier signal, the device of FIG. 8 may have the additional capability to generate arbitrary signals by modulating or mixing a baseband waveform of arbitrary content up to the desired output RF frequency.

The device of FIG. 8 includes driver electronics 804 and optical pulse sources 802 and 806, all of which may be similar to those discussed above with reference to FIGS. 1 and 2. In addition, a baseband waveform generator 808 may be used to generate the desired signal structure or information content of the desired output signal, as an electrical signal. For example, a DAC may be associated with the implementation of baseband waveform generator 808. The output of baseband waveform generator 808 may be provided to the input ports of a pair of EO modulators 810 and 812 in each arm of the signal generator. EO modulators 810 and 812 may modulate the amplitude of the optical pulses to capture the envelope of the baseband signal, which may effectively modulate or mix the baseband signal onto the optical time sampled version of the RF carrier signal. In this regard, the output from EO modulators 810 and 812 may be provided to amplitude and phase matching network modules 814 and 816, for further processing. The resulting electrical waveform 820 at the output of balanced photodetector 818 may be the baseband signal modulated onto the RF carrier.

While the upconversion processing in the DTOS WASS using baseband waveform generator 808 may be limited to signals equal to or less than half of the output carrier frequency (due to Nyquist criteria constraints), the ability to generate arbitrary amplitude components along with arbitrary frequency/phase components (in the form of time varying optical pulses) may allow the combination of approaches to achieve an arbitrary vector modulation capability that allows for generation of complex signals across the entire operating bandwidth of the WASS.

The operating range of the DTOS-WASS may be limited by the operating bandwidth of balanced photodetector 818. In this regard, operating bandwidths of upwards of 60 GHz can be achieved using commercial off the shelf photodetectors. However, this is not the ultimate limiting frequency on performance, since photodetectors with bandwidths in excess of 120 GHz have been demonstrated in the laboratory.

Figure 9:
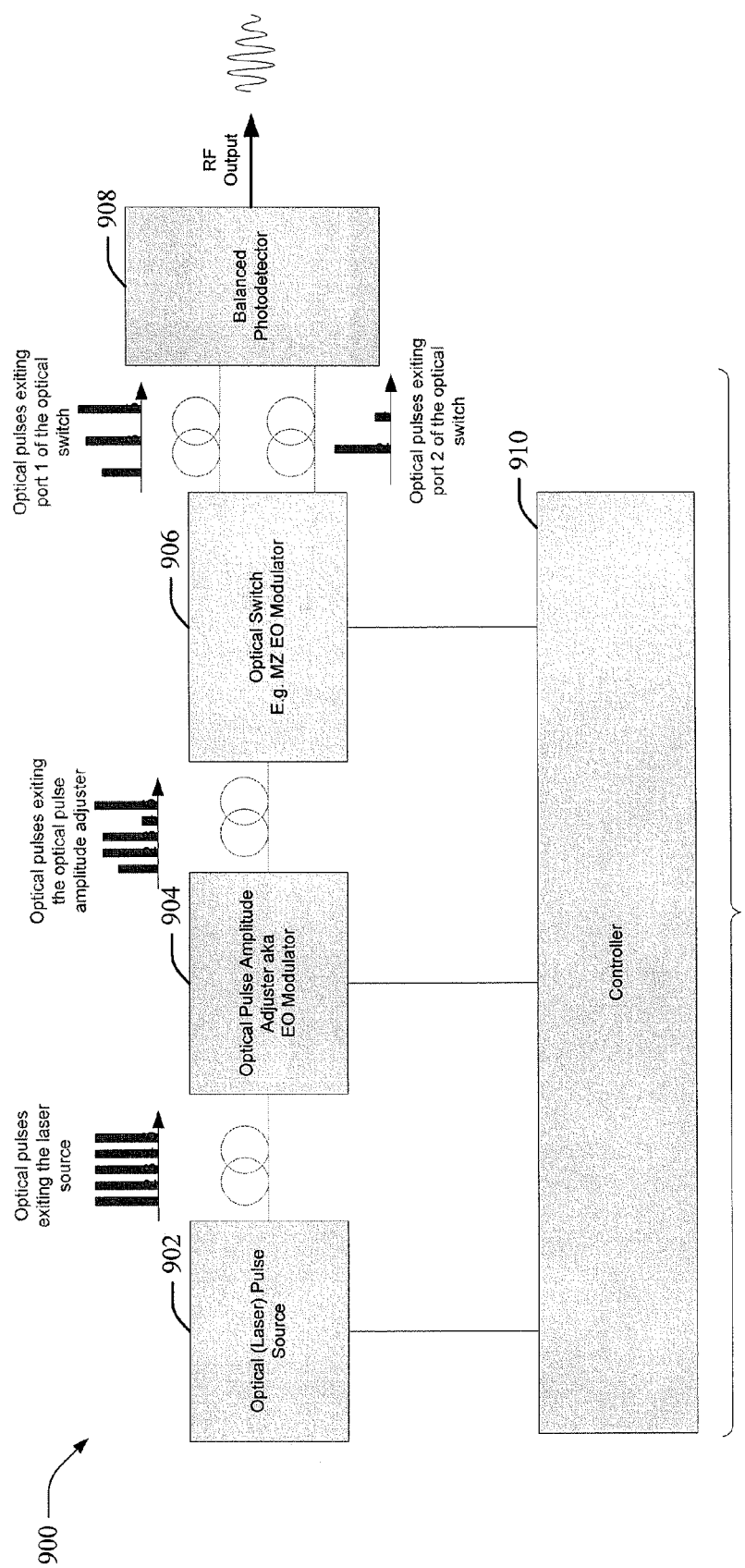
FIG. 9 is a block diagram illustrating a further example of a device for generating an RF signal.

FIG. 9 is a block diagram illustrating a further example of a device for generating an RF signal (including a microwave signal). As noted above with reference to FIGS. 1 and 8, two optical pulse sources may be used to generate two sets of optical pulses. As can be seen in FIG. 9, a single optical pulse source 902 may also be used to generate the two sets of optical pulses. Aspects of this implementation, for example, may be suitable for use in an integrated photonics integrated circuit.

Device 900 includes an optical pulse source 902, an optical pulse amplitude adjuster (e.g., EO Modulator) 904, an optical switch 906, a controller 910 and a balanced photodetector 908. Optical pulse source 902 may generate a series of optical pulses. This can be achieved in a number of ways, such as by gating a CW laser source with an electro-optic modulator (EOM), by modulating a diode laser source with a series of electronic pulses with the desired pulse profile, or by use of a mode-locked laser oscillator. Through the control of the timing for the pulse generation (e.g., the inter pulse period or pulse repetition frequency), the frequency and phase components of the generated RF signal can also be controlled.

Optical pulse amplitude adjuster 904 may allow for control of the amplitude for the pulse generation, which can be used to determine and control the resulting amplitude and phase components of the generated RF signal. Optical switch 906 may route alternating pulses to each optical input port of balanced photodetector 908, to generate the positive and negative amplitude values that emerge from the electrical output port as an RF signal. In this regard, the amplitude of each optical pulse from optical pulse source 902 can be individually adjusted using an EOM, such as a Mach-Zender (MZ) modulator (e.g., with a single output port) or an Electro-Absorption Modulator (EAM). It is also possible to integrate the pulse gating function and the amplitude adjustment function using a single implementation of an EOM.

Balanced photodetector 908 may convert the received optical signals to electrical signals. Balanced photodetector 908 may include a pair of connected photodetectors arranged with a common output, but configured with inverted polarities with respect to each other. By staggering the timing that the optical pulses are received at each input port of balanced photodetector 908, the resulting electrical signal may be forced through a zero crossing with each subsequent pulse, resulting in the generation of the RF carrier with a frequency determined by the inter-pulse period.

Controller 910 may provide a mechanism for controlling the pulse timing and amplitude, allowing for generation of arbitrary waveforms, subject to the limitations imposed by the Nyquist theorem (e.g., that the sample rate must be at least twice the frequency of the highest frequency component of the desired arbitrary waveform). Regarding optical pulse source 902, control of the timing by controller 910 for the pulse generation may determine the frequency and phase components of the generated RF signal. For optical pulse amplitude adjuster 904, control of the amplitude by controller 910 for the pulse generation may determine the amplitude and phase components of the generated RF signal.

FIG. 9 depicts each functional component that makes up device 900 (e.g., DTOS-WASS) as a separate block. However, it is possible to integrate functionality by implanting more than one functional component using a single optical device. For example, it is possible to combine elements of the pulse generation and pulse amplitude adjustment using a single EO modulator.

Figure 10:
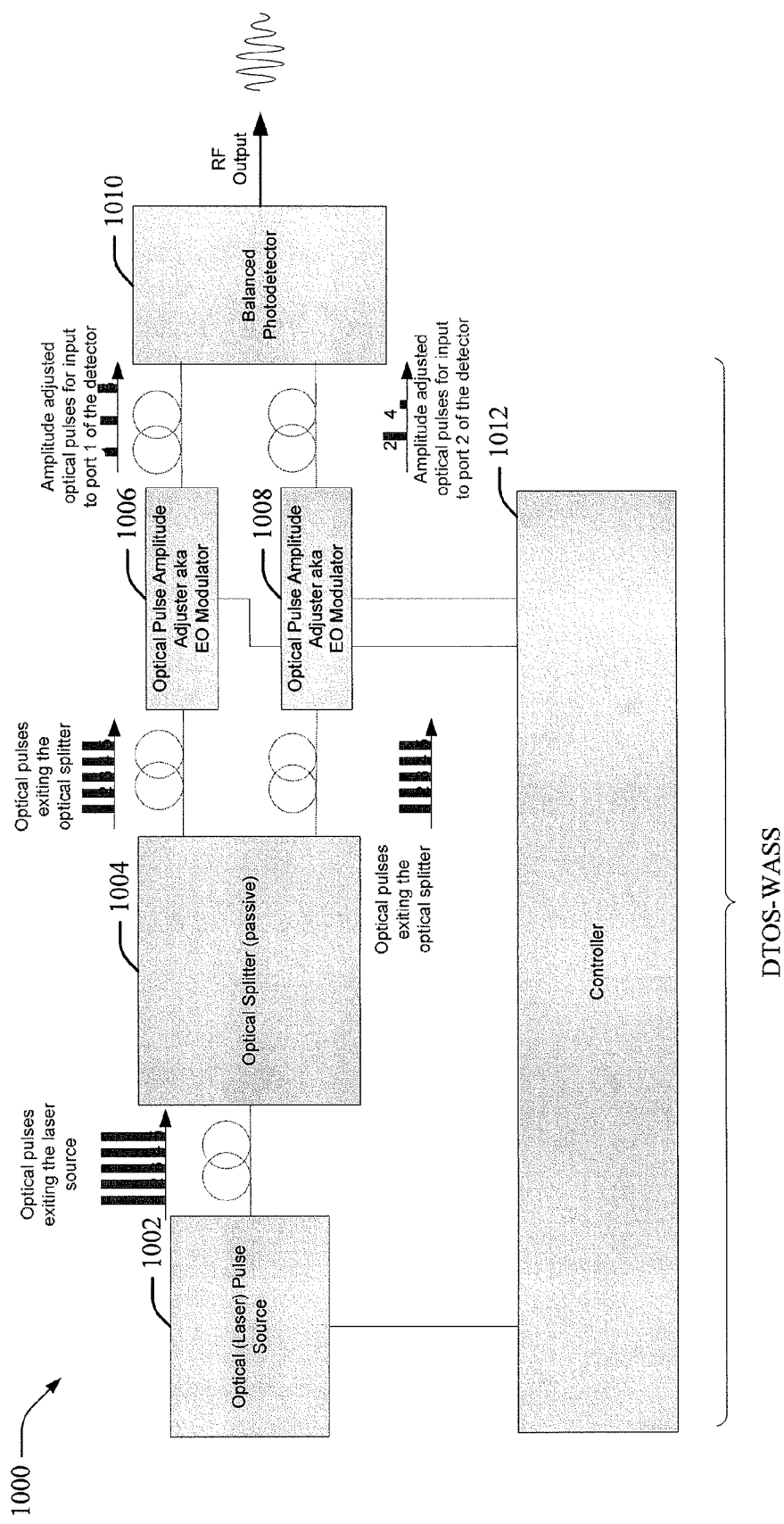
FIG. 10 is a block diagram illustrating a further example of a device for generating an RF signal.

FIG. 10 is a block diagram illustrating a further example of a device for generating an RF signal (including a microwave signal). As can be seen in FIG. 10, a single optical pulse source 1002 can be used to generate the two sets of optical pulses. For example, device 1000 of FIG. 10 may be compatible with implementation in a photonic integrated circuit.

In FIG. 10, a single optical pulse source 1002 is split into two paths using optical splitter 1004. Each path is input into a separate optical pulse amplitude adjuster 1006 and 1008 (e.g., EO modulator), which may also be used as a pseudo-switch to suppress the alternate pulses on each arm of optical splitter 1004. For example, the arm connected to port 1 of the detector may be used to amplitude modulate the odd pulses and suppress the even pulses. Conversely, the arm connected to port 2 of the detector may be used to amplitude modulate the even pulses and suppress the odd pulses. Pulse suppression may be achieved by driving the optical pulse amplitude adjuster 1006 or 1008 (e.g., an EO modulator such an Electro-Absorption or Mach-Zender modulator) to its extreme to minimize the optical amplitude at the modulator output. This approach may require that the modulation depth achievable by the modulator be sufficient to prevent leak-thru. Device 1000 also includes a balanced photodetector 1010 and a controller 1012, which may be similar to those described above.

Figure 11:
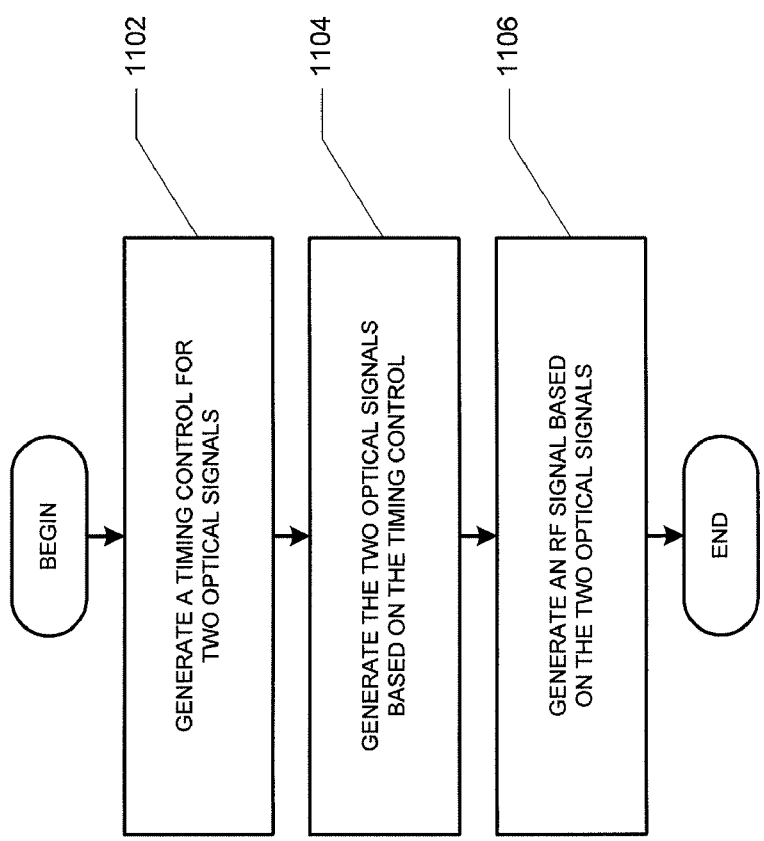
FIG. 11 is a flowchart illustrating an exemplary operation of generating an RF signal.

FIG. 11 is a flowchart illustrating an exemplary operation of generating an RF signal. As noted above, reference to an RF signal within this disclosure can also refer to a microwave signal. As can be seen in FIG. 11, a timing control is generated for two optical signals (block 1102). The two optical signals are generated based on the timing control (block 1104). An RF signal is generated, based on the two optical signals (block 1106).

As such, the above-described examples with regard to the various figures may be seen to correspond with using a DTOS as a WASS to generate RF signals with arbitrary content. Such RF signals may include wideband signals, such as linear and non-linear chirped signals, relatively fast frequency hopping signals, and more conventional-type RF signals.

Also, the above-described examples may be applicable in a wide range of signal generation applications, including test signal generation, conventional communication transmitters, covert (LPI/LPD) communication transmitters, conventional radar transmitters, synthetic aperture radar, LPI/LPD radar transmitters and imaging radar transmitters. Of course, the above-described examples with regard to the various figures are not limited to the these applications, and may be used for other signal generation applications.

Additionally, the above-described examples are seen to correspond with extended operating frequency ranges, both in terms of carrier frequency and bandwidth of resulting synthesized signals, improved ability to generate arbitrary chirp characteristics, and reducing or eliminating the need for high performance RF oscillators and RF tuning elements.

Furthermore, the above-described examples are seen to correspond with reducing or eliminating the need for an RF synthesizer. The use of optical pulses with direct detection is seen to reduce or eliminate the need for high performance, high stability optical laser sources, thus allowing use of simpler and lower cost laser devices. The use of a balanced photodetector arrangement is seen to reduce or eliminate effective carrier (or oscillator) leak-through.

In addition, the above-described examples are seen to be compatible with a discrete time optical signal and frequency translation concept, potentially allowing for sharing of common components between the transmit and receive sides of a systems, potentially further reducing size, weight, power and cost.

Figure 12:
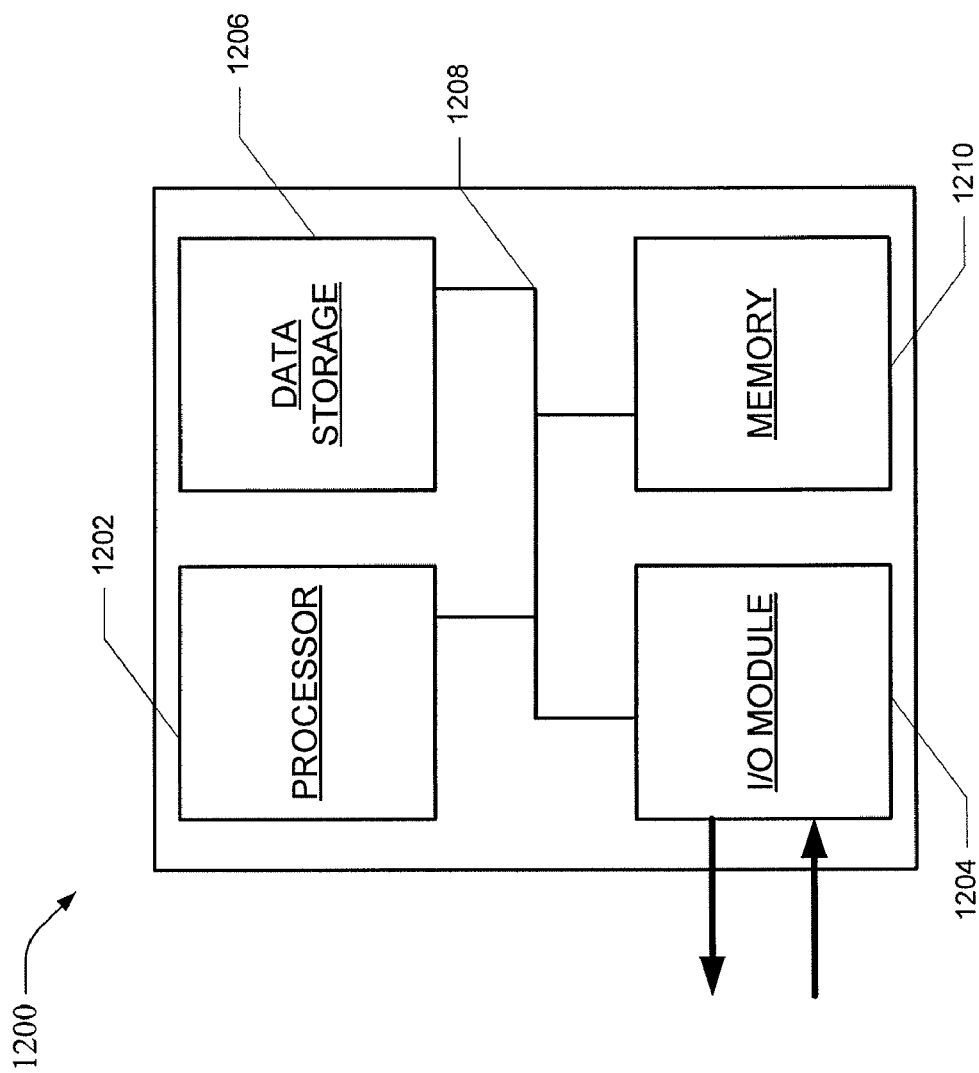
FIG. 12 is a block diagram illustrating an example of a computer system upon which may be used to generate an RF signal.

FIG. 12 is a block diagram that illustrates a computer system 1200 upon which an embodiment of the present disclosure may be implemented in accordance with one aspect of the present disclosure. Computer system 1200 includes a bus 1208 or other communication mechanism for communicating information, and a processor 1202 coupled with bus 1208 for processing information. Computer system 1200 also includes a memory 1210, such as a random access memory ("RAM") or other dynamic storage device, coupled to bus 1208 for storing information and instructions to be executed by processor 1202. Memory 1210 may also be used for storing temporary variable or other intermediate information during execution of instructions to be executed by processor 1202. Computer system 1200 further includes a data storage device 1206, such as a magnetic disk or optical disk, coupled to bus 1208 for storing information and instructions.

Computer system 1200 may be coupled via I/O module 1204 to a display device, such as a cathode ray tube ("CRT") or liquid crystal display ("LCD") for displaying information to a computer user. An input device, such as, for example, a keyboard or a mouse may also be coupled to computer system 1200 via I/O module 1204 for communicating information and command selections to processor 1202.

According to one aspect of the present disclosure, the generation of RF signals may be implemented using a computer system 1200 in response to processor 1202 executing one or more sequences of one or more instructions contained in memory 1210. Such instructions may be read into memory 1210 from another machine-readable medium, such as data storage device 1206. Execution of the sequences of instructions contained in main memory 1210 causes processor 1202 to perform the process steps described herein. One or more processors in a multi-processing arrangement may also be employed to execute the sequences of instructions contained in memory 1210. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1206. Transmission media include coaxial cables, copper wire, and fiber optics, including the wires that comprise bus 1208. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for generating an RF signal, comprising:
 a driver configured to generate a timing control for a first optical signal and a second optical signal;
 a first optical pulse source configured to generate the first optical signal having a first plurality of optical pulses and a second optical pulse source configured to generate the second optical signal having a second plurality of optical pulses, the first and second optical signals being based on the timing control; and a photodetector configured to receive the first and second optical signals as input and further configured to generate the RF signal based on the first and second optical signals, wherein at least one of the first and second optical pulse sources comprises a plurality of laser sources, and each of the plurality of laser sources generates one of the first and second optical signals, and wherein the photodetector generates positive RF values for the RF signal based on the received first plurality of optical pulses from the first optical signal and negative RF values for the RF signal based on the received second plurality of optical pulses from the second optical signal.

2. The apparatus of claim 1, wherein the photodetector comprises two input ports configured as a balanced photodetector, to receive the first and second optical signals, respectively.

3. The apparatus of claim 1, wherein the photodetector comprises a reconstruction filter configured to generate a continuous time RF signal as the RF signal.

4. The apparatus of claim 1, wherein the RF signal corresponds with at least one of a direct modulation signal, a frequency modulation signal, chirp signal and a phase modulation signal, based on the first and second optical signals.

5. The apparatus of claim 1, further comprising a baseband waveform generator configured to modulate a baseband waveform of arbitrary content up to a desired output RF frequency for the RF signal.

6. A method for generating an RF signal, the method comprising:
    generating a timing control for a first optical signal from a first optical pulse source and a second optical signal from a second optical pulse source;
    generating the first optical signal having a first plurality of optical pulses and the second optical signal having a second plurality of optical pulses, the first and second optical signals being based on the timing control; and
    generating the RF signal based on the first and second optical signals,
    wherein generating the first and second optical signals comprises generating at least one of the first and second optical signals from a plurality of laser sources, and
    wherein generating the RF signal comprises generating positive RF values for the RF signal based on the first plurality of optical pulses from the first optical signal and negative RF values for the RF signal based on the second plurality of optical pulses from the second optical signal.

7. The method of claim 6, wherein the generating the RF signal comprises generating a continuous time RF signal as the RF signal.

8. The method of claim 6, wherein the RF signal corresponds with at least one of a direct modulation signal, a frequency modulation signal, chirp signal and a phase modulation signal, based on the first and second optical signals.

9. The method of claim 6, further comprising:
    modulating a baseband waveform of arbitrary content up to a desired output RF frequency for the RF signal.

10. A non-transitory, machine-readable medium encoded with instructions for generating an RF signal, the instructions comprising code for:
    generating a timing control for a first optical signal from a first optical pulse source and a second optical signal from a second optical pulse source;
    generating the first optical signal having a first plurality of optical pulses and the second optical signal having a second plurality of optical pulses, the first and second optical signals being based on the timing control; and
    generating the RF signal based on the first and second optical signals,
    wherein generating the first and second optical signals comprises generating at least one of the first and second optical signals from a plurality of laser sources, and
    wherein generating the RF signal comprises generating positive RF values for the RF signal based on the first plurality of optical pulses from the first optical signal and negative RF values for the RF signal based on the second plurality of optical pulses from the second optical signal.

11. The machine-readable medium of claim 10, wherein the generating the RF signal comprises generating a continuous time RF signal as the RF signal.

12. The machine-readable medium of claim 10, wherein the RF signal corresponds with at least one of a direct modulation signal, a frequency modulation signal, chirp signal and a phase modulation signal, based on the first and second optical signals.

13. An apparatus for generating an RF signal, comprising:
    an optical pulse source coupled to an optical splitter configured to generate both a first optical signal having a first plurality of optical pulses and a second optical signal having a second plurality of optical pulses;
    a first EO modulator operatively coupled to the first optical signal and a second EO modulator operatively coupled to the second optical signal;
    a controller configured to control the first and second EO modulators; and
    a photodetector configured to receive the first and second optical signals as input and further configured to generate the RF signal based on the first and second optical signals,
    wherein the photodetector generates positive RF values for the RF signal based on the received first plurality of optical pulses from the first optical signal and negative RF values for the RF signal based on the received second plurality of optical pulses from the second optical signal.

14. The apparatus of claim 13, wherein the optical splitter comprises a 2-port wavelength selective device for generating the first and second optical signals from the optical pulse source.

15. The apparatus of claim 13, wherein the optical pulse source is configured to use a plurality of lasers to generate each of the first and second optical signals.

* * * * *